United States Patent

Sakai

[11] Patent Number: 5,249,011
[45] Date of Patent: Sep. 28, 1993

[54] AUTOMATIC FOCUSING METHOD

[75] Inventor: Nariyasu Sakai, Tokyo, Japan

[73] Assignee: Asahi Kogaku Kogyo K.K., Tokyo, Japan

[21] Appl. No.: 518,262

[22] Filed: May 7, 1990

Related U.S. Application Data

[63] Continuation of Ser. No. 138,116, Dec. 28, 1987, abandoned.

[30] Foreign Application Priority Data

Dec. 26, 1986 [JP] Japan .................. 61-313172

[51] Int. Cl.$^5$ ........................... G03B 13/36
[52] U.S. Cl. ........................................ 354/402
[58] Field of Search .................. 354/400-409

[56] References Cited

U.S. PATENT DOCUMENTS 4,341,447 7/1982 Biber .................. 354/408

Primary Examiner—W. B. Perkey
Attorney, Agent, or Firm—Sughrue, Mion, Zinn, Macpeak & Seas

[57] ABSTRACT

An automatic focusing method is disclosed with which a plurality of selected objects can be held within the focusing range of the photographing lens of a camera. For each of object for which it is desired to keep within the focusing range, a focusing detection operation is carried out to provide defocusing data for the object. A weighted mean value of the defocusing data is employed as a common focal position.

14 Claims, 5 Drawing Sheets

AUTOMATIC FOCUSING METHOD

This is a continuation of application Ser. No. 07/138,116 filed Dec. 28, 1987, now abandoned.

BACKGROUND OF THE INVENTION

The present invention relates to an automatic focusing method which can be suitably applied to a device having an automatic focusing capability function, such as an AF (automatic focusing) camera.

Recently, a variety of lens-interchangeable cameras or video cameras having an AF function have become commercially available. With these cameras, it is possible for anyone to readily achieve photographing operations or video recording operations as desired.

By way of example, convention automatic focusing function will be described with reference to a lens-interchangeable camera.

First, the general arrangement of an automatic focusing camera having an automatic focusing function (hereinafter referred to as "an AF camera" when applicable) will be described with reference to FIG. 1.

In FIG. 1, reference numeral 11 designates a photographing lens, and 31, a camera body on which the photographing lens 11 is mounted.

The photographing lens 11 includes a lens system 15 including a lens 13 which is freely movable in the direction of the optical axis for focusing; a drive force transmitting mechanism 17 composed of a clutch 17a, a gear 17b and a helicoid screw for transmitting a drive force from a drive mechanism 47 (described below) in the camera body 31 to move the lens 13 to a focusing position; a lens ROM (read-only memory) 19 for storing aperture value data for the photographing lens and position data for the lens 13; and an electrical contact group 21 on the lens side for electrically connecting the photographing lens 11 to the camera body 31.

The camera body 31 includes an optical system composed of a main mirror 33, an auxiliary mirror 35, a focusing screen 37, a pentagonal prism 39, light detecting element 41a and 41b used for AE (automatic exposure) control, and an electrical contact group 43 on the body side which is coupled to the electrical contact group 21 on the lens side. The camera body further includes an image pick-up section 45 which receives a part of the light beam from an object to be photographed, which has passed through the lens system 15 to form the image of the object. In the case where the focusing position detection is carried out according to the correlation method (phase difference system), the image pickup section 45 is implemented with an optical system including a separator lens, and a CCD (charge-coupled device) having two image pickup regions. The camera body 31 further includes the drive mechanism 47 for driving the movable lens 13 in the photographing lens 11. The drive mechanism 47 has an AF motor 47a which is a DC motor, a gear 47b, a clutch 47c and an encoder 47d for controlling the speed of the motor 47a. The drive force of the drive mechanism 47 is transmitted through the gear 47b, the clutch 47c of the camera body 31 and the clutch 17a of the lens 11 to the movable lens 13, whereby the lens 13 is moved along the optical axis. The camera body further includes a control section 49 which operates to calculate an amount of defocusing D indicating the amount of deviation from the focused position in response to the output signals of the image pickup section 45, the value D being employed to drive the drive mechanism 47 according to the amount of defocusing D, and to perform automatic exposure photographing operations.

In the camera having an AF capability as described above, the automatic focusing operation to move the movable lens 13 to the focused position is carried out as follows:

First, a shutter button (not shown) is depressed halfway, or a focus lock button (not shown) is depressed, whereby the camera is placed in the automatic focusing mode. In this case, the control section 49 uses the output data of the image pickup section 45 to obtain defocusing data including an amount of defocusing D and a direction of defocusing for the object according to the conventional correlation method. Thereafter, the control section 49 determines, according to the amount of defocusing D, the amount of drive P required for the motor 47a to move the movable lens 13 to the focused position.

The amount of drive P can be determined in terms of a number of rotations of the motor 47a; that is, it can be set according to the pulse count number of the pulse signal from the encoder 47d which detects the rotation of the motor. For this purpose, in the control section, the pulse number P for eliminating defocusing is obtained according to the following equation (1):

$$P = K \cdot D \qquad \ldots (1)$$

where K is the lens movement conversion coefficient. The coefficient K is predetermined so as to obtain a pulse count number P which moves the movable lens 13 to the position where the lens is positively focused on the object according the value D. Each individual photographing lens has its own coefficient K. The value K is stored in the lens ROM 19.

The motor 47a is driven until the total number of pulses of the pulse signal from the encoder 47 reaches the value P in equation (1). At that point, the object will have been automatically focused.

When the shutter is operated or the focus lock button is released, the automatic focusing operation is accomplished.

In this conventional automatic focusing method, focusing is carried out only in response to light from a designated physical object. In other words, the lens can be focused only on a single physical object, and it is impossible to focus the lens at a spatial point between one physical object and another physical object. This causes the following difficulties.

The case will be considered where it is required to photograph a plurality of objects located at different positions in one picture. In this case, it is preferable that the lens be focused on a point located between these objects and a certain distance away from the camera so that the lens is substantially equally focused on all the objects. However, the conventional automatic focusing method cannot do this.

Furthermore, if, in the case where only one object is to be photographed and the object has upwardly and downwardly curved parts, it is preferable that the photographing operation be carried out with the lens focused on a point between the curved parts from the camera. However, the conventional automatic focusing method again cannot do so.

When the shutter is operated once or the focus lock button is released, the focusing operation is ended, and therefore a series of focusing steps must be carried out when another picture is to be taken. Therefore the conventional focusing method suffers for a difficulty in that it is impossible to carry out photographing operations successively at one and the same focusing position.

SUMMARY OF THE INVENTION

Accordingly, an object of the invention is to eliminate the above-described difficulties accompanying a conventional automatic focusing method. More specifically, an object of this invention is to provide an automatic focusing method with which the lens can be focused on a point where no physical object is present, for instance, a point at a designated distance from the camera, and the lens can be maintained focused at the desired focused position as long as desired.

The foregoing object of the invention has been achieved by the provision of an automatic focusing method in which, according to the invention, focus detection is carried out with respect to more than one object to provide defocusing data including an amount of defocusing and a direction of defocusing, and the weighted mean value of the defocusing data is employed as a common focal position.

According to the automatic focusing method of the invention, the photographing lens can be substantially equally focused not only on a plurality of objects in the same photographing region, but also on inwardly and outwardly curved parts of an object. Furthermore, the focus condition is maintained unchanged until focus detection is carried out for another object.

BRIEF DESCRIPTION OF THE DRAWINGS

In the accompanying drawings.

DESCRIPTION OF THE PREFERRED EMBODIMENTS

A preferred embodiment of an automatic focusing method according to the invention will be described with reference to the accompanying drawings.

Prior to describing an example of the automatic focusing method of the invention, an automatic focusing device suitable for practicing the method will be described in conjunction with an AF camera.

Figure 1:
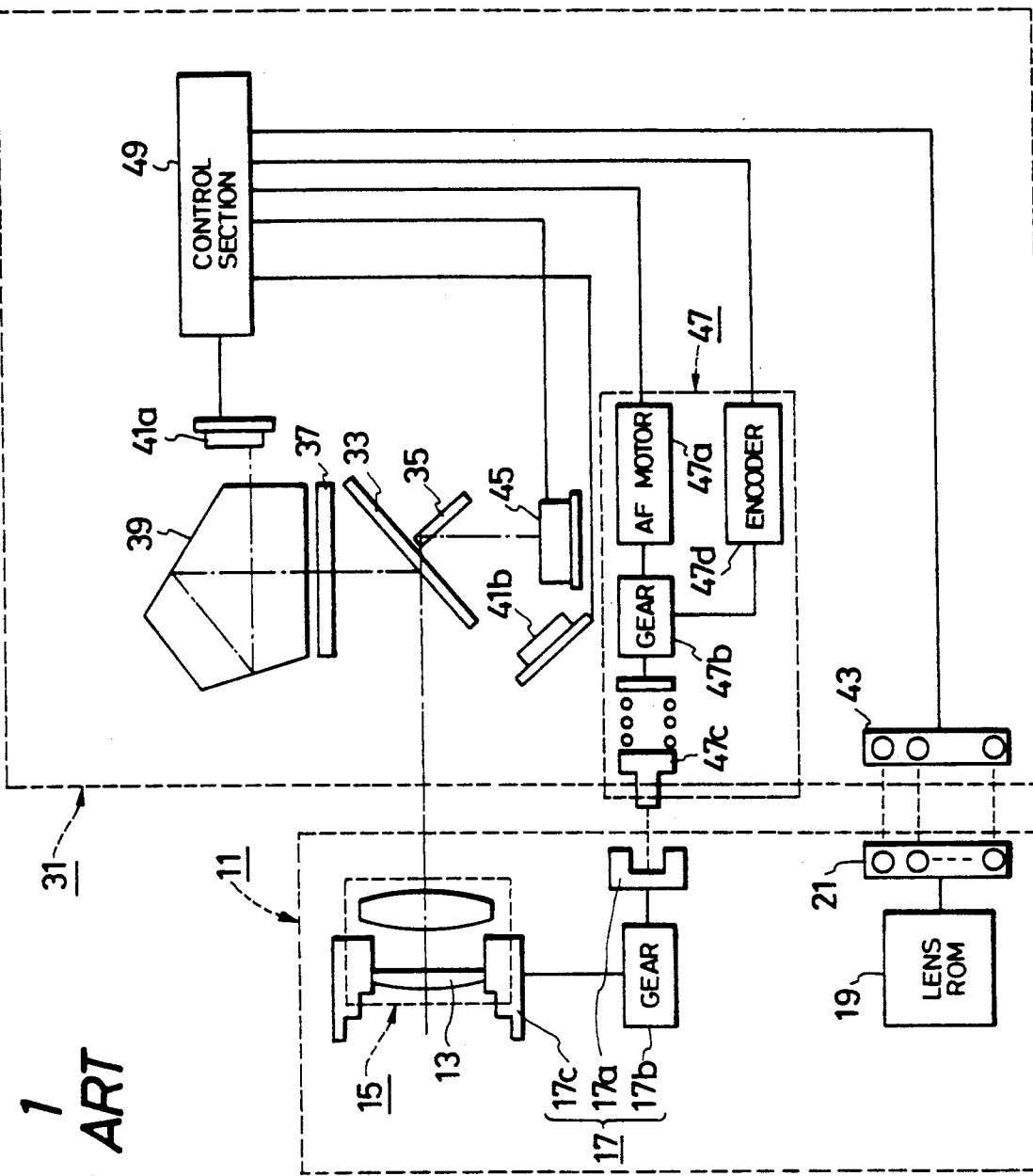
FIG. 1 is an explanatory diagram, partly as a block diagram, showing the arrangement of a camera operating according to a conventional automatic focusing method.
Figure 2:
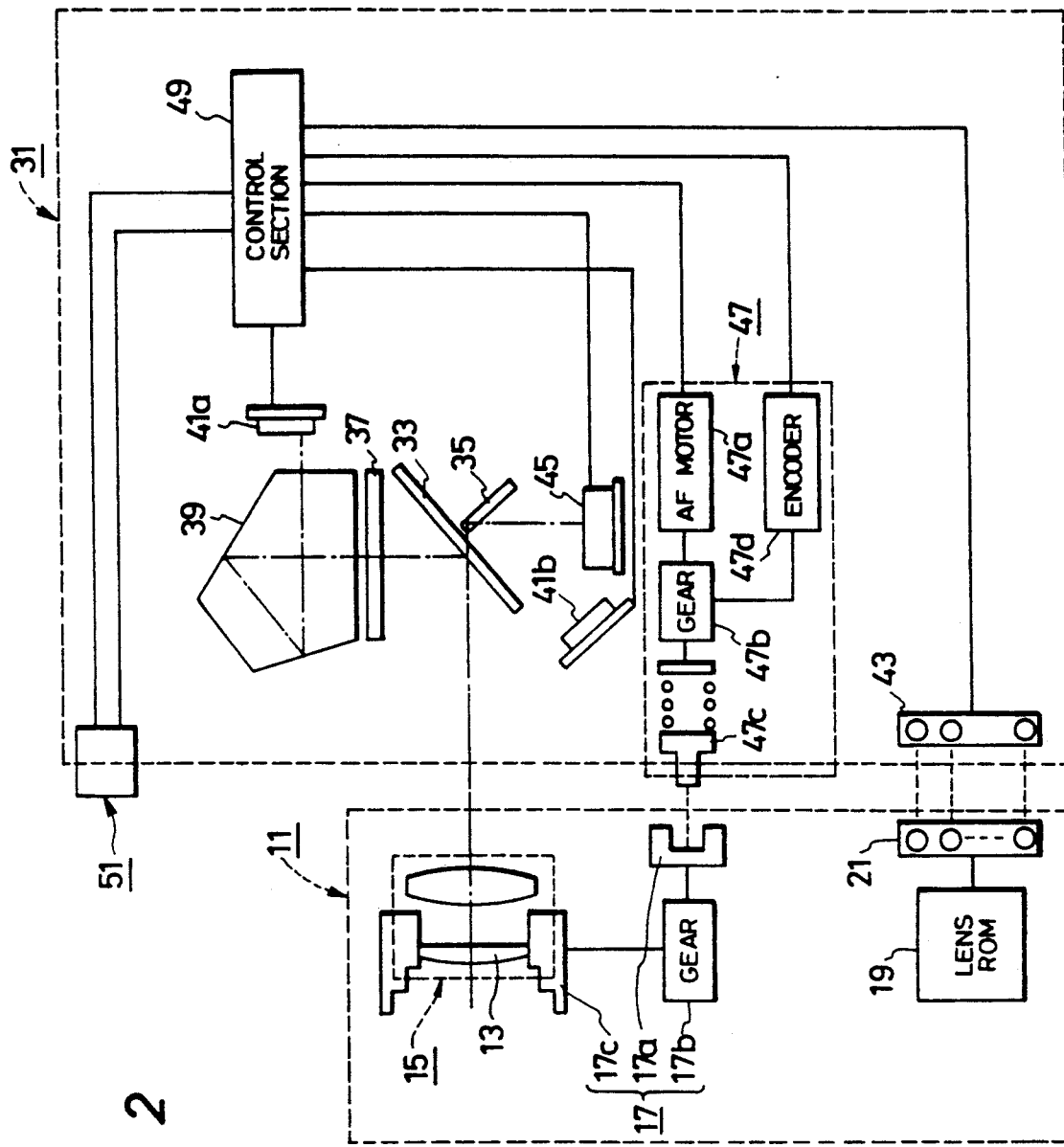
FIG. 2 is an explanatory diagram, partly as a block diagram, showing the arrangement of a camera to which an automatic focusing method of the invention can be suitably applied.

FIG. 2 is a diagram showing the general arrangement of an AF camera. This AF camera is constructed by adding components necessary for practicing the method of the invention to the AF camera which has been described with reference to FIG. 1. Therefore, mainly only the added components will be described here. FIG. 2 shows the AF camera merely to the extent that the invention can be understood, and therefore it goes without saying that the size, configuration and position of the components are not limited to those shown in FIG. 2.

In FIG. 2, reference numeral 51 designates an automatic focusing method switching circuit. The switching circuit 51 is operated to allow the camera to select the conventional automatic focusing method, described with reference to FIG. 1, or the automatic focusing method of the invention.

Figure 3A:
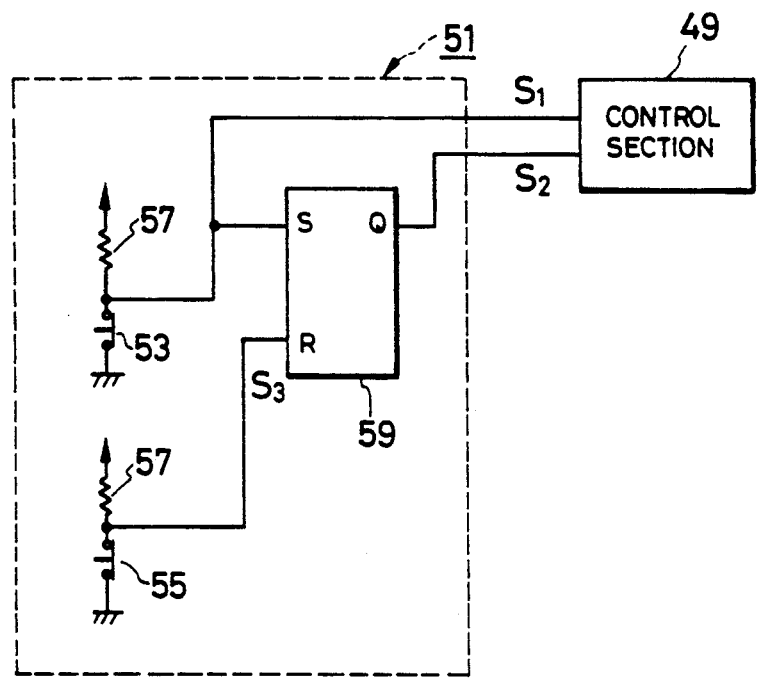
FIG. 3A is a circuit diagram, partly as a bock diagram, showing an example of an automatic focusing method switching circuit provided in the camera shown in FIG. 2.

The switching circuit 51 can be implemented with two switches, a flip-flop circuit 59, and pull-up resistors 57 as shown in the FIG. 3A.

In FIG. 3A, reference numeral 53 designates a multi-point distance measurement instruction switch for switching the AF camera from the AF operation according to the conventional method to that according to the invention (and hence which switch is hereinafter referred to as "an instructing switch" when applicable), and reference numeral 55 designates a multi-point distance measurement releasing switch for switching the camera from the operation according to the automatic focusing method of the invention to that according to the conventional automatic focusing method (and hence which switch is hereinafter referred to as "a release switch" when applicable). In this case, the term of "multi-point distance measurement" means to obtain the defocusing data with respect to a plurality of objects in the same photographing region (one picture frame). Both of the switches 53 and 55 are normally closed switches. One terminal of each of the switches 53 and 55 is connected through a pull-up resistor 57, for instance, to a power source for driving the control section 49, and the other terminal is grounded.

The terminal of the switch 53 connected to the pull-up resistor 57 is further connected to the set terminal S of an RS flip-flop circuit 59, whereas the terminal of the switch 55 connected to the pull-up resistor 57 is connected to the reset terminal R of the FF circuit 59. The terminals Q and S of the FF circuit 59 are connected to the control section 49. The instructing switch 53 and the release switch 55 can be provided at suitable position for instance, beside the shutter button on the camera body.

The AF camera according to the invention can be designed so that it operates according to the conventional automatic focusing method when the signal $S_2$ applied to the control section 49 from the output terminal Q of the FF circuit 59 is at a low level, and according to the automatic focusing method of the invention when it is at a high level.

Therefore, when the signal at the terminal Q of the FF circuit 59 is set to the low level by the initializing process in association with the selection of the AF mode of the camera, the focusing operation is carried out according to the conventional automatic focusing method after the start of the AF mode operation. On the other hand, when the instruction switch 53 is operated by the operator for the first time, the voltage at the terminal S of the FF circuit 51 is raised to a high level, and accordingly the voltage at the terminal Q of the FF circuit 51 is also raised to the high level. Thus, the AF camera carries out a focusing operation according to the automatic focusing method of the invention. The operation according to the automatic focusing method of the invention is continued until the release switch 55 is turned on to thereby raise the voltage at the terminal Q to the high level.

The release switch 55 is normally held off. Therefore, even if the instructing switch 53 is turned on during the period from the time instant that the voltage at the terminal Q is raised to the high level in response to the first "on" operation of the instructing switch 53 until the release switch 55 is turned on, the voltage of the terminal Q is maintained at the high level. For that period, whenever the instructing switch is turned on, the signal $S_1$ is supplied to the control section 49. Every time the signal is raised to the high level, the image pickup section 45 applied to the control section 49 the defocusing data obtained by the focus detection of the object located, for instance, at the center of the region to be photographed through the photographing lens 11.

Figure 3B:
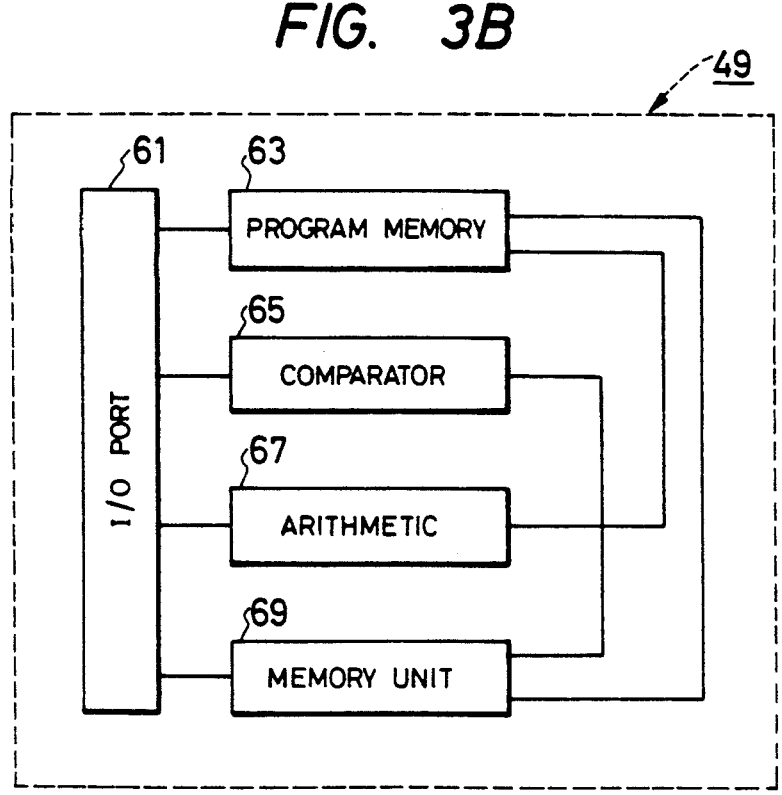
FIG. 3B is a block diagram showing the arrangement of a control section provided in the camera of FIG. 2.

FIG. 3B is a block diagram showing essential components forming the control section 49.

In FIG. 3B, reference numeral 61 designates an input/output port. The input/output port 61 is connected to the terminals Q and S of the FF circuit 59 described above, the lens ROM 19, the image pickup section 45, and the lens drive mechanism 47. That is, the data are transmitted between the control section and the circuit elements through the input/output port 61.

Further in FIG. 3B, reference numeral 63 designates a program memory in which are stored programs required for the various operations of the AF camera. That is, a program for effecting the automatic focusing method according to the invention can be stored in the program memory 63.

Reference numeral 64 designates a comparator used, for instance, for comparing the amount of drive P of the motor 47a described with reference to FIG. 1 with the total number of pulses of the pulse signal from the encoder 47d. Reference numeral 67 designates an arithmetic unit which carries out a variety of arithmetic operations. Reference numeral 69 designates a memory unit in which are stored predetermined constants and variables provided by the arithmetic unit 67.

The automatic focusing method according to the invention will be described with reference to FIG. 2, FIGS. 3A and 3B, and FIGS. 4A and 4B.

A specific feature of the inventive automatic focusing method is that focus detection is carried out with respect to more than one object, and the weighted mean of the defocusing data including the defocusing amount and the defocusing direction, which is obtained through such focus detection, is employed as the common focal position with respect to these objects. The term "more than one object as used herein is intended to mean a plurality of points in the same region to be photographed. The points may be a plurality of objects located at different positions in the same region to be photographed, or a plurality of parts of a single object in the same region to be photographed, and the term also covers the case where focus detection is carried out with respect to one part of one object several times.

Figure 4A:
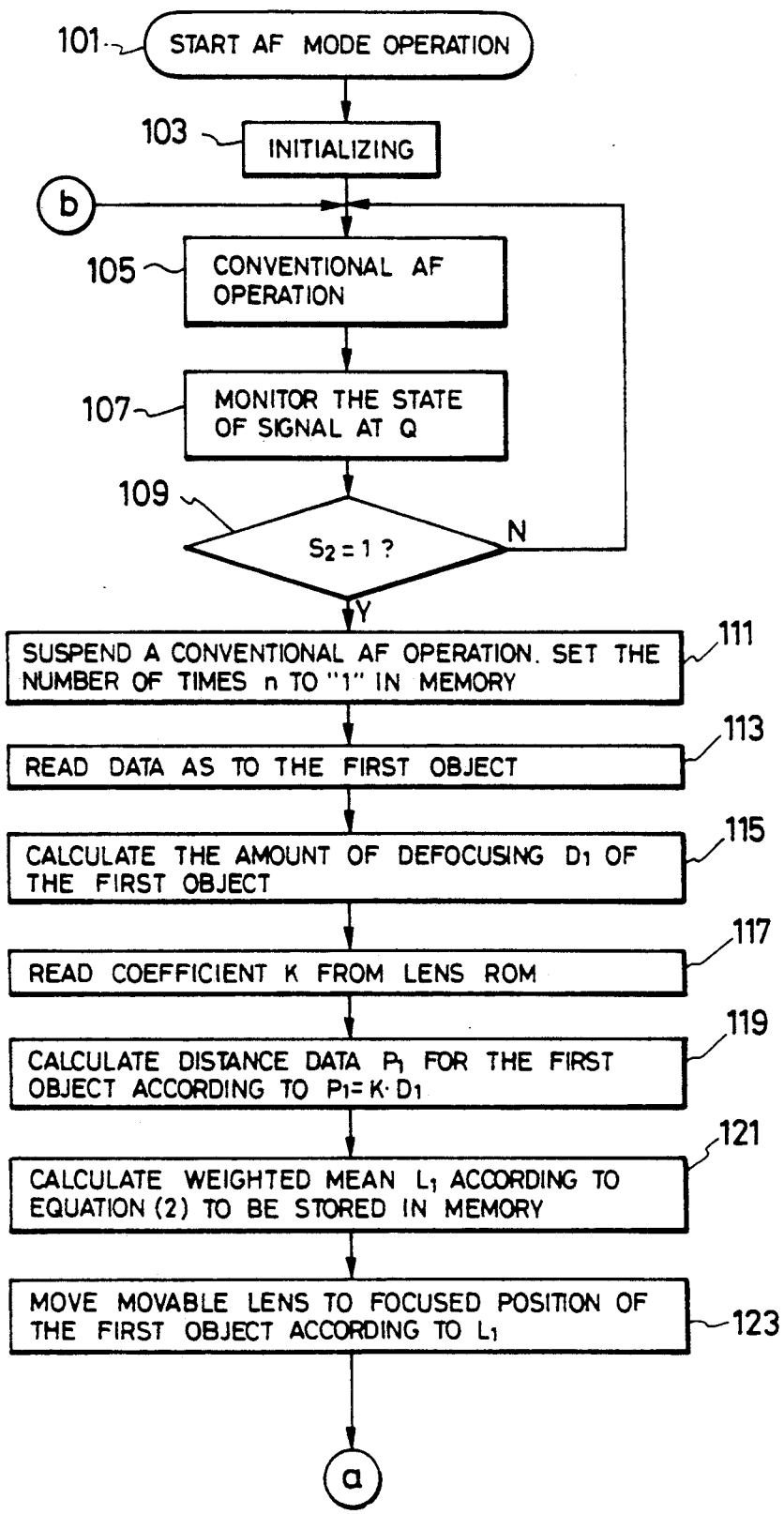
FIGS. 4A and 4B, taken together, are a flowchart for a description of the automatic focusing method according to the invention.
Figure 4B:
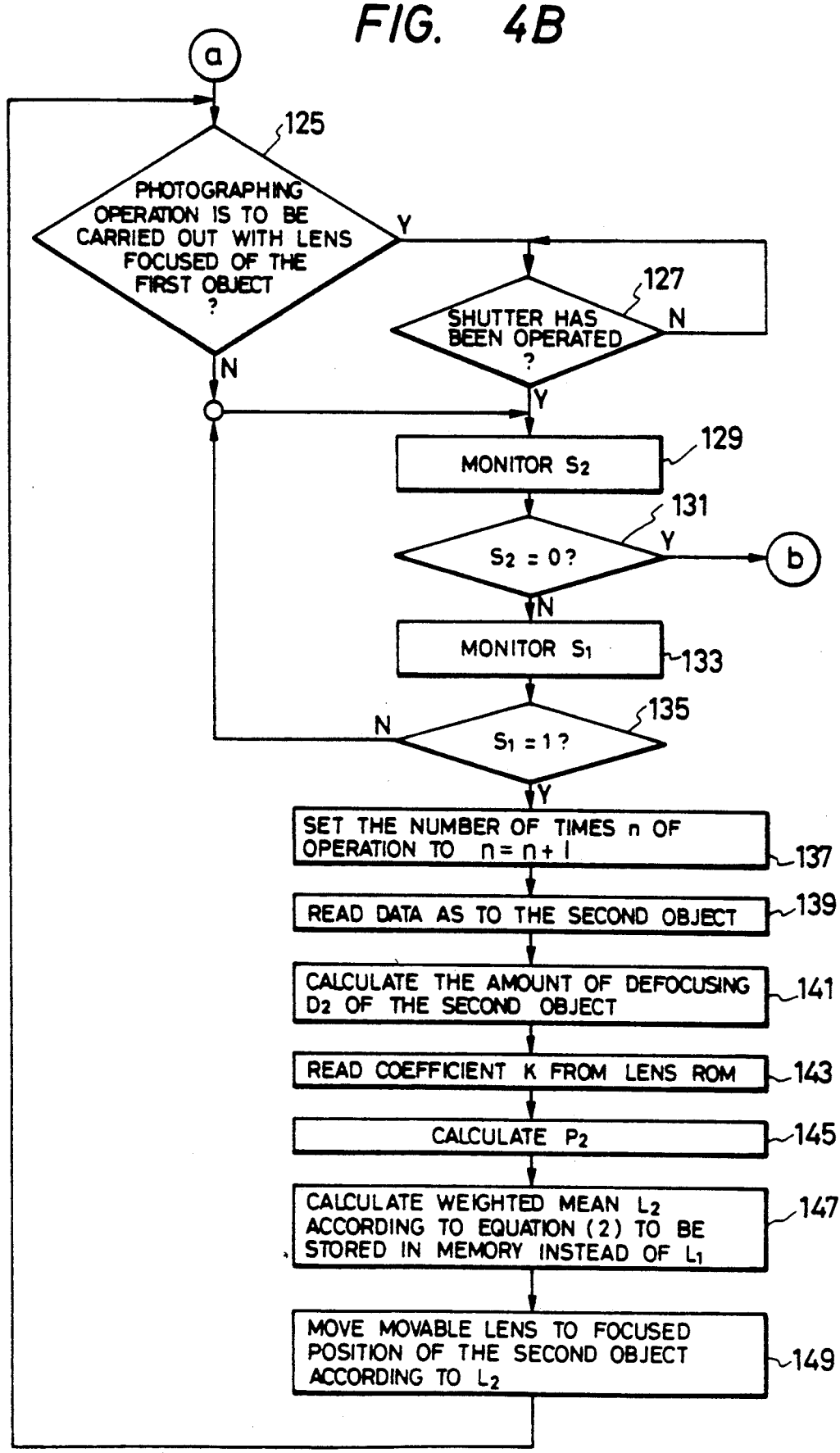

FIGS. 4A and 4B, taken together, are a flowchart showing the operation of the automatic focusing method of the invention. A program for carrying out the operation shown in this flowchart has been stored in the program memory 63.

A photographing operation in the automatic focusing mode is selected manually or automatically (Step 101).

In association with an initializing operation at the start of the photographing operation in the AF mode, the control section 49 starts the focusing operation according to the conventional automatic focusing operation as described with reference to FIG. 1 (Steps 103 and 105). The control section 49 monitors the state of the signal $S_2$ at the output terminal Q of the FF circuit 59 in the switching circuit every predetermined period (Steps 107 and 109). When the signal $S_2$ at the terminal Q is at the low level, the focusing operation is continued according to the conventional automatic focusing method (Steps 103 to 109).

When, under this condition, the instructing switch 53 is turned on by the operator (photographer) for the first time the FF circuit 59 latches the signal $S_1$, whereupon the signal $S_2$ at the terminal Q of the FF circuit 59 is raised to the high level from the low level. The change of the signal $S_2$ is transmitted to the control section 49, as a result of which the focusing operation according to the conventional automatic focusing method is suspended. In this operation, the number of times n of operation of the instructing switch (n=1 in this case) is stored in the memory unit 69 of the control section 49 (Steps 109 and 111). Furthermore, in response to the signal $S_1$ being raised to high level, data are transferred from the image pickup section 45 to the control section 49 with which focus detection is carried out with respect to an object located at, for instance, the center of the region to be photographed (hereinafter referred to as "a first object") (Step 113). In the arithmetic unit 67, the amount of defocusing $D_1$ with respect to the first object is calculated according to the data received for the image pickup section 45 (Step 115).

Thereafter, the coefficient K is transmitted from the lens ROM 19 to the control section 49 so that the amount of drive $P_1$ needed for moving the movable lens 13 to the focused position of the first object is calculated according to equation (1) described above (Step 119).

The amount of drive $P_1$ and the number of times n of operation of the instructing switch 53 are used to obtain the weighted mean $L_n$ of the amount of drive according to the following equation (2). In this case, the weighted mean $L_n$ also represents the direction of defocusing.

$$L_n = (L_{n-1}(n-1) + P_n)/n \qquad \ldots (2)$$

With respect to the first object, $P_n$ is $P_1$, and $(n-1) = 0$, and therefore the lens drive data $P_1$ is equal to the weighted mean $L_1$. The value L is stored in the memory unit 69 in the control section 49 (Step 121).

Since, as discussed above, $P = K \cdot D$, where D is an amount of defocusing and K is a conversion coefficient, the foregoing equation may be expressed as:

$$L_n = (L_{n-1}(n-1) + K \cdot D_n)/n \qquad (3)$$

where $L_{n-1}$ is a previous weighted mean value.

Further, since K is merely a conversion coefficient, the equation may be expressed as:

$$L_n = (L_{n-1}(n-1) + D_n)/n \qquad (3')$$

The AF motor 47a is driven until the pulse count value of the pulse signal from the encoder 47d reaches the value $L_1$, whereupon the movable lens 13 has been moved to the focused position of the first object (Step 123). The pulse count value is compared with the value $L_1$ by the comparator 65 in the control section 49.

Next, it is determined whether or not the photographing operation is to be carried out with the lens focused on the first object (Step 125). When it is determined that the photographing operation is to be carried out, the control section 49 detects whether or not the shutter has been operated (Step 127). When the photographing operation has been completed, or in the case where the photographing operation is not carried out and instead focus detection is carried out on another object, the control section 49 monitors the signal $S_2$ to determine whether or not the operator desires a focusing operation according to the conventional automatic focusing method (Step 129). When the signal $S_2$ is at the low level ($S_2=0$), i.e., the terminal Q of the FF circuit 59 is set to the low level, Step 105 is effected again so that the focusing operation is carried out according to the conventional method (Steps 131 and 105).

When $S_2=1$, it is determined that the operator desires the focusing operation according to the automatic focusing method of the invention. In this operation, the control section 49 monitors the state of the signal $S_1$ at all times (Step 133). In this case, the operator moves the camera so that a second object at a different position from the first object and which is to be photographed together with the first object is in the center of the photographing region. When, thereafter, the instructing switch 53 is turned on by the operator, the number of times n of operation of the instruction switch 53, which is now two (n=2), is stored in the memory unit 69 of the control section 49 (Steps 135 and 137). In response to the signal $S_1$ being raised to the high level, the data are transferred from the image pickup section 45 to the control section 49 to perform focus detection on the second object (Step 139). In the arithmetic unit 67, an amount of defocusing $D_2$ of the second object is calculated according to the data provided by the image pickup section 45 (Step 141).

Next, the control section 49 receives the coefficient K from the lens ROM 19 (Step 143). As in the calculation of the amount of drive $P_1$, an amount of drive $P_2$ for the AF motor 47a to move the movable lens 13 to the focused position of the second object is calculated (Step 145).

The amount of drive $P_2$, the number of times n of operation of the instruction switch 53 and the weighted means $L_1$ for the first object are used to calculate the weighted mean $L_2$ of the amount of drive of the first and second objects. This calculation is carried out by the arithmetic unit 69.

In this case, $P_n=P_2$, $L_{n-1}\cdot(n-1)=L_1$, and n=2, and therefore the weighted mean $L_2=(L_1+P_2)/2$. The datum $L_1$ stored in the memory unit 69 of the control section 49 is replaced by the datum $L_2$; that is, the datum $L_2$ is stored in the memory unit 69 (Step 147).

The weighted mean $L_2$ can be used as the common focal position of the first and second objects. Therefore, by driving the AF motor 47a to move the lens 13 until the pulse count value of the pulse signal from the encoder 47d reaches the value $L_2$, the lens can be focused both on the first and second objects substantially equally.

The operations according to the above-described Steps 125 to 149 are similarly carried out for a third object through an n-th object to obtain the weighted mean $L_n$ of the amount of drive of the first through n-th objects, thereby to obtain the common focal position of the n objects. Accordingly, by driving the AF motor 47a to move the lens 13 until the pulse count value of the pulse signal from the encoder 47d reaches the value $L_n$, the lens 13 is positioned so as to be focused on all of the first through n-th objects substantially equally.

In the case where focus detection is carried out for the n objects successively as described above and one of the objects may be located infinitely far away for the camera, similar to the above-described embodiment, the inventive automatic focusing operation can be carried out by employing the amount of drive of the motor to the end position corresponding to infinity as the amount of drive to obtain the weighted means.

In the above-described embodiment, every time the weighted mean is obtained, the movable lens 13 is moved to a position corresponding to the weighted mean, and photographing operations at that position can be successively carried out until focus detection is performed for a new object in response to an instruction entered with the instructing switch 53, or the conventional automatic focusing method can be selected again with the release switch 55.

In the above-described embodiment, focus detection is carried out with respect to a plurality of objects at different positions in a photographing region successively, and a weighted mean value is obtained for every focus detection. This concept can be applied to an object having greatly outwardly and inwardly curved parts, as described above. That is, if the focus detection is carried out successively for these parts, the lens can be focused on all parts of the object substantially equally.

Furthermore, in the above-described embodiment, each time focus detection is carried out for an object, the weighted mean value is obtained and stored in the memory unit. If the defocusing data for each object is stored in the memory means whenever detected, then the data can be more effectively utilized. For instance, the weighted means value can be obtained after, among the defocusing data, abnormal data have been removed.

In the above-described embodiment, the defocusing data is obtained according to a correlation method using the image pickup section 45. However it goes without saying that the defocusing data can be obtained in other ways.

Of course, the switching circuit 51, the photographing lens and the camera body described above may be changed or modified in various manners without departing from the invention.

For instance, in the switching circuit 51, the instructing switch 53 and the release switch 55 may be turned on exactly at the same time. In such a case, the switching circuit 51 my be designed so that one of the focusing operations according to the conventional automatic focusing method and the automatic focusing method of the invention takes precedence over the other.

The automatic focusing method of the invention is applicable to devices other than photographing cameras, such as video cameras, telescopes and ordinary cameras having a lens shutter.

As is apparent from the above description, the automatic focusing method of the invention permits the photographing lens to focus on a point where no object is physically present. Therefore according to the invention, the lens can be focused substantially equally not only on a plurality of objects in the same photographing region, and but also on a plurality of inwardly and outwardly curved parts of the same object. Therefore, application of the invention to a camera provides pictures excellent in quality.

Finally, it should be noted that it is preferable to determine an aperture value so that all of the objects in the same photographing region are put within the depth of field of a photographing lens mounted to the camera body.

I claim:

1. An automatic focusing method, comprising the steps of:

carrying out in succession, a focus detection operation for each of a plurality of objects to be included within a focusing range of a photographing lens to provide a defocusing data $D_n$ including an amount of defocusing and a direction of defocusing for each of said objects;

for each said focus detection operation, calculating a weighted mean value with respect to the present and all previous defocusing data values; and employing a weighted mean value $L^n$ calculated from a last of said objects as a common focal position for said objects, using a formula:

$$L_n = (L_{n-1}(n-1) + KD_n)/n$$

where $L_{n-1}$ is a previous weighted mean value, and K is a lens movement conversion coefficient.

2. A method according to claim 1 further comprising the step of:

successively moving said photographic lens according to an amount of advancement of said photographing lens, said amount of advancement being determined based on said calculated value $L_n$.

3. An automatic focusing method as claimed in claim 1, wherein each said focus detection operation for each said object is user-selected with respect to time.

4. An automatic focusing method as claimed in claim 3, wherein each said focus detection operation for each said object is also user-selected with respect to aiming an optical axis of said photographic lens toward a selected said object.

5. An automatic focusing method, comprising the steps of:

carrying out in succession, a focus detection operation for each of a plurality of objects to be included within a focusing range of a photographing lens to provide a defocusing data $D_n$ including an amount of defocusing and a direction of defocusing for each of said objects;

calculating from said defocusing data $D_n$, an amount of drive $P_n$ needed for moving said photographing lens to a focusing position; and calculating a weighted mean $L_n$ from said amounts of drive $P_n$ according to a formula $$L_n = (L_{n-1}(n-1) + P_n)/n$$

where $L_{n-1}$ is a previous weighted means position value.

6. A method according to claim 5 further comprising the step of:

successively moving said photographing lens according to an amount of advancement of said photographing lens, said amount of advancement being determined based on said calculated value $L_n$.

7. A method according to claim 5 wherein said step of carrying out said focus detection operation comprises the steps of:

depressing an instructing switch when a respective object is in a predetermined position of a photographing region;

calculating a total number n of depressions of said instructing switch from a start of said defocusing method; and obtaining defocusing data of said respective object.

8. An automatic focusing method, comprising the steps of:

carrying out in succession, a focus detection operation for each of a plurality of objects to be included within a focusing range of a photographing lens to provide a defocusing data $D_n$ including an amount of defocusing and a direction of defocusing for each of said objects; and for each said focus detection operation, calculating a weighted mean value with respect to the present and all previous defocusing data values and moving said photographing lens to a focus position according to said weighted mean value.

9. A method according to claim 8 wherein said weighted mean value is obtained according to a formula:

$$L_n = (L_{n-1}(n-1) + KD_n)/n$$

where $L_{n-1}$ is a previous weighted mean value, and K is a lens movement conversion coefficient.

10. An automatic focusing method, comprising the steps of:

carrying out in succession, a focus detection operation for each of a plurality of objects to be included within a focusing range of a photographing lens to provide a defocusing data $D_n$ including an amount of defocusing and a direction of defocusing for each of said objects;

for each said focus detection operation, calculating a weighted mean value with respect to the present and all previous defocusing data values; and employing a weighted mean value $L_n$ calculated from a last of said objects as a common focal position for said objects, using a formula:

$$L_n = (L_{n-1}(n-1) + D_n)/n$$

where $L_{n-1}$ is a previous weighted mean value.

11. A method according to claim 10 further comprising the step of:

successively moving said photographic lens according to an amount of advancement of said photographing lens, said amount of advancement being determined based on said calculated value $L_n$.

12. An automatic focusing method as claimed in claim 10, wherein each said focus detection operation for each said object is user-selected with respect to time.

13. An automatic focusing method as claimed in claim 12, wherein each said focus detection operation for each said object is also user-selected with respect to aiming an optical axis of said photographic lens toward a selected said object.

14. A automatic focusing method, comprising the steps of:

carrying out in succession, a focus detection operation for each of a plurality of objects to be included within a focusing range of a photographing lens to provide a defocusing data $D_n$ including an amount of defocusing and a direction of defocusing for each of said objects;

for each said focus detection operation, calculating a weighted mean value with respect to the present and all previous defocusing data values and moving said photographing lens to a focus position according to said weighted mean value; and wherein said weighted mean value is obtained according to a formula:

$$L_n = (L_{n-1}(n-1) + D_n)/n$$

where $L_{n-}$ is a previous weighted mean value.

* * * * *